(No Model.)

B. H. BRISTOL.
MICROMETER GAGE.

No. 261,201. Patented July 18, 1882.

WITNESSES:

Chas. Nias

Chas. E. Simms Jr.

INVENTOR

Benjamin H. Bristol

BY _____

ATTORNEY

N. PETERS. Photo-Lithographer. Washington, D. C.

UNITED STATES PATENT OFFICE.

BENJAMIN H. BRISTOL, OF NAUGATUCK, CONNECTICUT.

MICROMETER-GAGE.

SPECIFICATION forming part of Letters Patent No. 261,201, dated July 18, 1882.

Application filed February 17, 1882. (No model.)

*To all whom it may concern:*

Be it known that I, BENJAMIN H. BRISTOL, of Naugatuck, New Haven county, State of Connecticut, have invented a new and useful Improvement in Micrometer-Gages; and I do hereby declare that the following is a full, clear, and exact description of the same, reference being had to the accompanying sheet of drawings, making part of this specification.

This invention is in the nature of an improvement in micrometer-gages, for ascertaining the thickness of sheet metal and other materials; and the invention consists in a micrometer-gage constructed in the manner hereinafter fully described, in combination with a ring, whereby said gage may be retained on the finger of and be operated by one hand.

Figure 1:
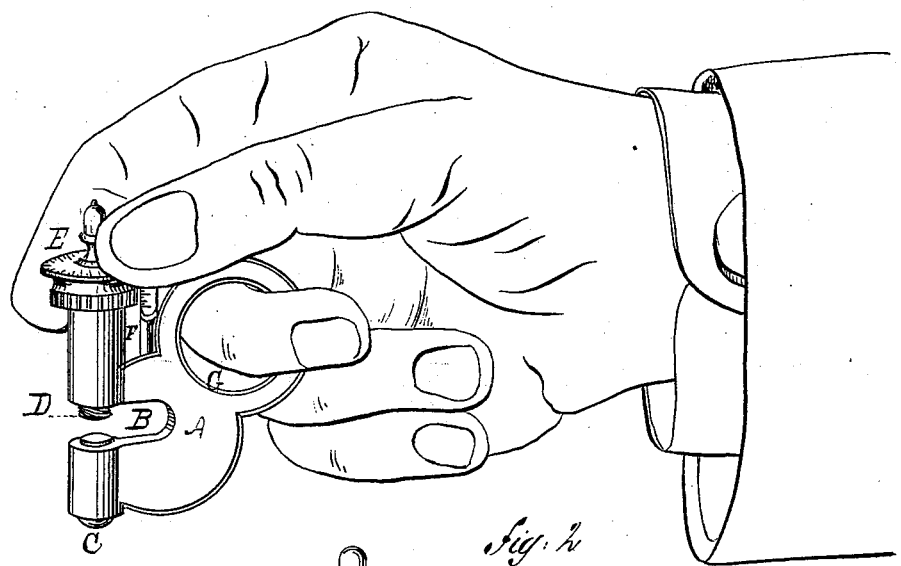
Figure 2:
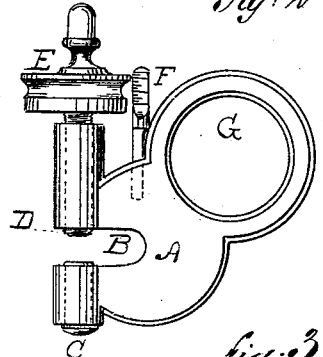
Figure 3:
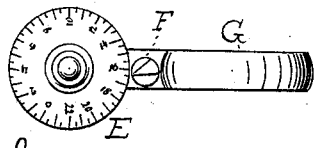

In the accompanying sheet of drawings, Figure 1 is a perspective view, showing the application of the gage to the hand; Fig. 2, a side view of gage; Fig. 3, a plan or top view of same.

Similar letters of reference indicate like parts in the several figures.

This invention relates more particularly to that class of gages which are used for ascertaining with extreme accuracy the thickness of materials—for instance, that of sheet metal, wire, or other material.

This gage is constructed with a plate, A, in which is formed an opening, B, of any desired width and length. Through the plate, on one side of the opening B, is inserted a screw-bearing pin, C, and on the other side of this opening, immediately opposite this bearing-pin, is inserted a screw, D, to which screw, at or near its outer end, is fixed a dial-wheel, E, with a scale graduated according to the pitch of the screw-threads. In this instance the pitch of the screw being forty to the inch, I have made on my dial twenty-five divisions, each division representing one one-thousandth of an inch, and in connection with this scale of the dial I employ a blade, F, which is attached to the plate A, extending parallel with the screw D and beyond the perimeter of the dial E, the edge of the blade being adjacent the perimeter of the dial, and also having a graduated scale, each division of which, in this instance, will represent twenty-five thousandths of one inch, or the distance the screw D would ascend or descend on one revolution of the dial E. In the plate A is formed a ring, G, of such size as will permit the ring to pass over the second finger of the user's hand.

Now, when my gage is constructed substantially as hereinbefore described it is used by placing the second finger of either hand through the ring G and inserting the material to be measured into the opening B, and with the forefinger and thumb turn the dial-wheel E until the screw D is brought against the surface of the material that is to be gaged in the opening B, clamping the plate between the end of this screw and the end of the bearing-screw C. This being done, the division of the wheel E that is immediately against the knife-edge of the graduated arm F is read in connection with the graduations on the arm F, this reading giving the thickness of the material being measured in thousandths of an inch and fractions thereof, as in other micrometer-gages; but since my gage, by reason of its ring G, can be retained and operated by one hand, the other hand of the user is left free to be employed in supplying the material to the gage for measurement, the result being a great saving of time where large quantities of material are to be gaged—as, for instance, many tons of sheet metal. The gage, once in place on the finger, need not be removed until the entire work of gaging is completed.

Having now described my invention, what I claim as new, and desire to secure by Letters Patent, is—

A micrometer-gage provided with a ring, G, into which a finger is to be inserted, whereby the gage may be retained in and be operated by one and the same hand.

BENJAMIN H. BRISTOL.

Witnesses:
L. S. BEARDSLEY,
E. A. BEARDSLEY.